(12) United States Patent
Wallner et al.

(10) Patent No.: US 6,266,124 B1
(45) Date of Patent: Jul. 24, 2001

(54) DEVICE FOR FOCUSING A FILM FRAME

(75) Inventors: Kurt Wallner, Eching; Walter Trauninger, Laab im Walde, both of (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 0 days.

(21) Appl. No.: 09/230,531
(22) PCT Filed: Jul. 22, 1997
(86) PCT No.: PCT/DE97/01578
 § 371 Date: Jan. 26, 1999
 § 102(e) Date: Jan. 26, 1999
(87) PCT Pub. No.: WO98/04955
 PCT Pub. Date: Feb. 5, 1998

(30) Foreign Application Priority Data

Jul. 26, 1996 (DE) .............................. 196 31 553

(51) Int. Cl.⁷ .............................. G03B 31/00; G03B 3/00
(52) U.S. Cl. .............................. 352/35; 352/34; 352/139; 352/140
(58) Field of Search .............................. 352/34, 35, 139, 352/140, 242; 396/72, 79, 89, 144

(56) References Cited

U.S. PATENT DOCUMENTS

| | | | |
|---|---|---|---|
| 3,250,197 | 5/1966 | Fladlien et al. | 396/144 |
| 3,584,559 | 6/1971 | Levin | 396/50 |
| 4,437,552 | 3/1984 | Toyama | 192/26 |
| 4,536,066 | * 8/1985 | Bauer | 352/35 |
| 5,037,195 | * 8/1991 | Clairmont et al. | 352/35 |
| 5,225,941 | * 7/1993 | Saito et al. | 359/824 |
| 5,237,352 | * 8/1993 | Grosser et al. | 352/35 |
| 5,706,074 | * 1/1998 | Kohler et al. | 352/35 |

FOREIGN PATENT DOCUMENTS 3424014  1/1986  (DE) .

* cited by examiner

Primary Examiner—Russell Adams
Assistant Examiner—Rodney Fuller
(74) Attorney, Agent, or Firm—Christie, Parker & Hale, LLP

(57) ABSTRACT

A device for focusing a film picture in a movie film camera with a camera housing which has a lens carrier 5 for holding a camera lens, with a camera end which forms a lens plane, and a film window where a film is moved along in an image plane by means of a film transport device. A device for changing the distance between the lens plane and the image plane is provided.

7 Claims, 6 Drawing Sheets

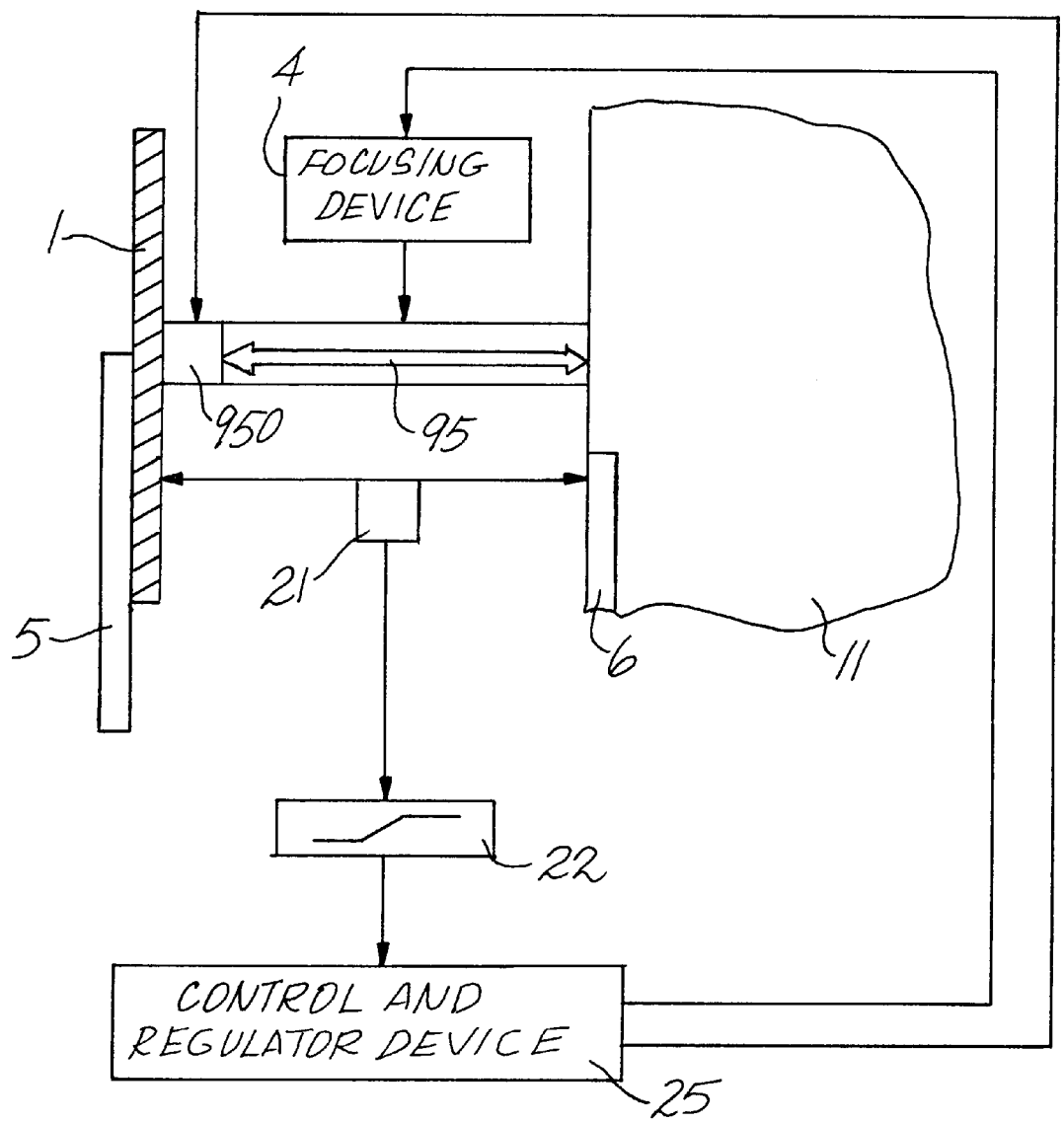

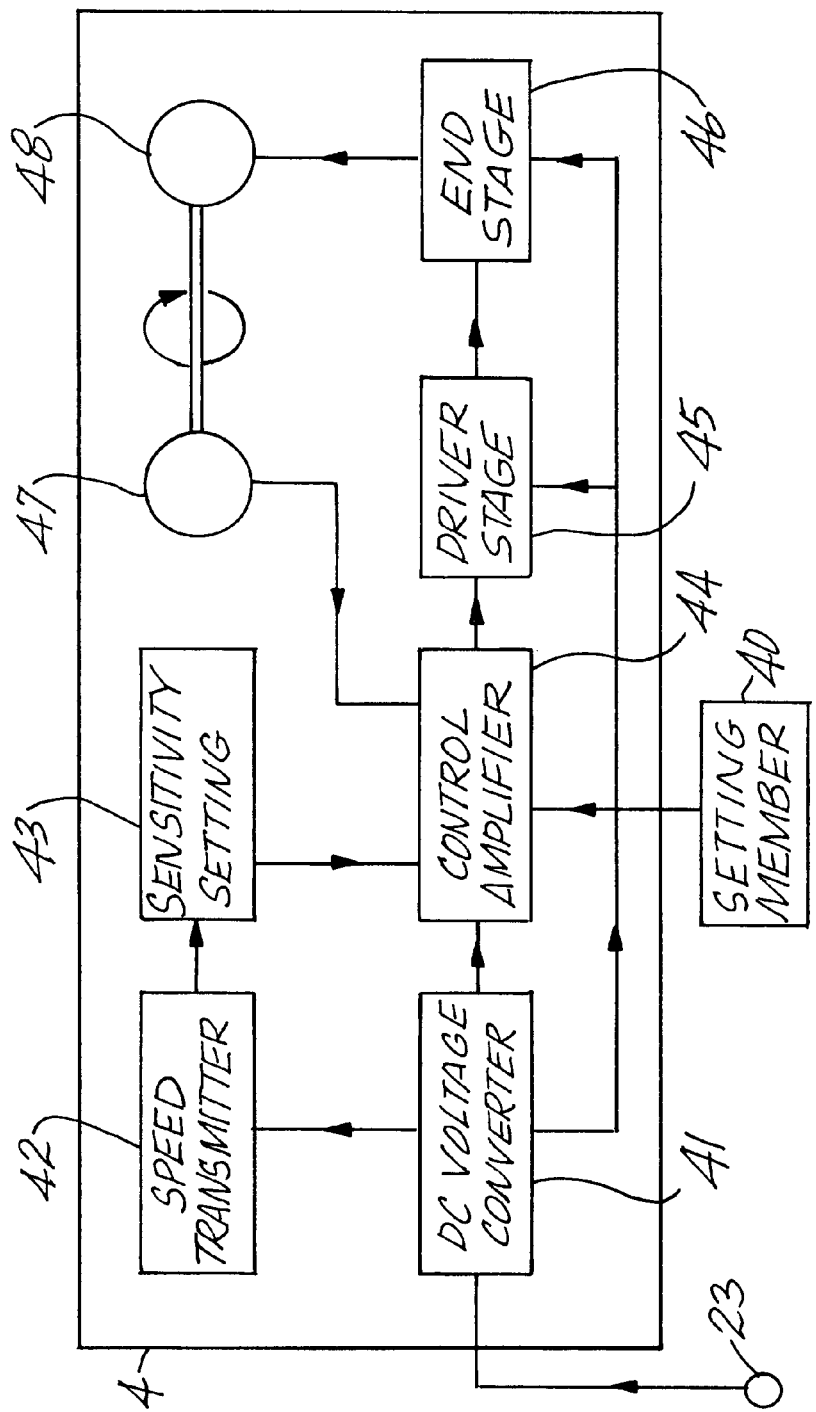

DEVICE FOR FOCUSING A FILM FRAME

FIELD OF THE INVENTION

The invention relates to a device for focusing a film frame.

BACKGROUND OF THE INVENTION

For setting the iris diaphragm opening, picture definition and focal width of a camera lens, lens rings are mounted on the lens housing. By turning the lens rings, the lens system is linearly displaced through a gearing and, thus, the picture definition and focal width of the camera lens are changed. The manual adjustment of the iris diaphragm opening, focus and focal width (zoom) of the camera lens on the lens rings provided for this purpose is difficult for the cameraman. This is particularly difficult when viewing, at the same time, the image through the viewfinder eyepiece. Making reproducible setting of certain focal widths, focus values and iris diaphragm openings is linked with considerable difficulties and, further, pre-programming predeterminable values is not possible.

For a simpler and more reliable setting of the lens rings, drive units are known which are fixed on iris rods connected to the camera housing and each transferring, through a pinion, a torque to an external gearing of the lens rings so as to carry out the adjustment of the lens rings in this way. With these additional drive units, the operation is easier for the cameraman and there is the possibility of connecting the drive units to a control device or to set pre-programmable values for the iris diaphragm opening, the image definition and focal width of the camera lens.

Converting the rotary movement of the lens rings into the linear displacement of the lens system of the camera lens requires, however, a certain play in order to allow easy adjustability. In the same way, a certain play between the pinion of the drive unit and the external teething of the lens ring is unavoidable, which is a problem particularly when focusing where the slightest displacements of the camera lens can lead to the image being out of focus. Less of a problem is setting the iris diaphragm opening and the focal width, because the image detail and the depth of focus can be easily corrected and even slightly inaccurate settings need not lead to the shots becoming unusable.

In many cases the use of an optically optimized lens with fixed focal width is possible wherein only the adjustment of the iris diaphragm opening and image definition is required.

From U.S. Pat. No. 4,437,552, a movie film camera is known having a shutter, film transport mechanism and a focusing device which are driven by a common drive motor through a spring coupling. The camera lens is connected to a displacement device for the translatory displacement of the camera lens. The device consists of a connecting rod which is mounted in fixed guides and is connected to a cam disc. The cam disc controls the translation movement of the camera lens and is connected to a worm gear connected to the spring coupling. The displacement device is additionally connected to a device for automatically focusing the film pictures.

From U.S. Pat. No. 3,250,197 a focusing device for an image converter connected to a picture carrier is known which consists of a device for the translatory displacement of the distance between a lens assembly connected to the image converter and the picture carrier.

From DE A 342 40 14 a stationary film camera is known wherein to focus the picture it is not the lens, but the film gate with the film window which is moved in translation along the optical axis of the stationary film camera. The translatory displacement is undertaken by several spindles set parallel to the optical axis and engaging in threaded bores of the film gate. Through a synchronous turning of the spindles, the film gate is moved in translation in the direction of the optical axis until, in dependence on an automatic distance meter, an electromagnetically operated locking means drops into the gearing. After film exposure and during the next film transport step, the gearing is returned with the film gate back to the starting position.

SUMMARY OF THE INVENTION

The object of the present invention is to provide a precise and reproducible focusing device which can be used for automatic image definition adjustment without any lens ring or drive unit attached to the camera lens. A further object is to connect this focusing device to a device for blocking or insulating the noises emanating from a camera mechanism of a movie film camera.

The solution according to the invention provides, firstly, a device for focusing a film image in a movie film camera which allows a precise setting of the image definition and is particularly suitable for automatic focusing and integration of the image definition setting in the automatic operation of a movie film camera and, secondly, provides a high noise deadening or noise insulation of the noises emanating from the camera mechanism in the case of a movie film camera which consists of an outer camera housing and an inner camera which are connected together through controllable connecting elements.

The noise-insulating connecting elements which are mounted to reduce or insulate the noise between the film window and the lens carrier are thereby additionally used for adjusting the focus so that no additional structural measures are required in the camera housing of the movie film camera because the corresponding control of the connecting elements is integrated in the control and regulating electronics of the movie film camera.

The solution according to the invention is particularly suitable for using a camera lens with a fixed lens assembly, that is, for a camera lens of predetermined focal width wherein, either a setting of the iris diaphragm opening can be executed outside of the camera lens or an iris diaphragm is not provided.

The displacement device preferably contains a guide device running parallel to the optical axis of the movie film camera and consists of a guide rail and a guide slide which is connected to the displacement device.

The displacement device preferably consists of an electromagnetic, electrostrictive, magnetostrictive or piezo-electric converter whose length can be changed by means of a control switch.

The change in the distance between the lens plane and image plane can be selectively carried out by a device for the translatory displacement of the lens carrier and/or camera lens along the optical axis of the movie film camera or by a device for the translatory displacement of the film window along the optical axis of the movie film camera.

The translatory displacement of the camera lens along the optical axis of the movie film camera is particularly suitable for integration of the displacement device in the camera housing and thus, in particular, for use in new movie film cameras.

For the translatory displacement of the lens carrier along the optical axis of the movie film camera, an adapter can advantageously be mounted between the camera lens and lens carrier. The adapter has an assembly for the translatory displacement of the distance between a lens fixing and connection with the lens carrier. This assembly is particularly suitable for equipping existing movie film cameras having a fixed connection of the lens carrier on the camera housing of the movie film camera.

A translatory displacement of the film window makes it possible to shift the image plane for adjusting the image definition without internal or external displacement of the camera lens. The use of a camera lens of fixed focal width is thereby particularly possible with optimum matching of the lens system so that no optical losses occur through the displacement or displaceability of the camera lens.

Also, the use of existing lenses provided with one lens ring for setting the image definition is possible, utilizing the advantages according to the invention in that, for example, a fixed focal value is set and this setting is fixed.

BRIEF DESCRIPTION OF THE DRAWINGS

The idea on which the invention is based will now be explained with reference to the embodiments shown in the drawings in which:

FIG. 7 is a block circuit diagram for an adjustment device; and

FIG. 8 is a block circuit diagram for an adjustment device with active noise-insulating connecting elements.

DETAILED DESCRIPTION OF THE PREFERRED EMBODIMENT

Figure 1:
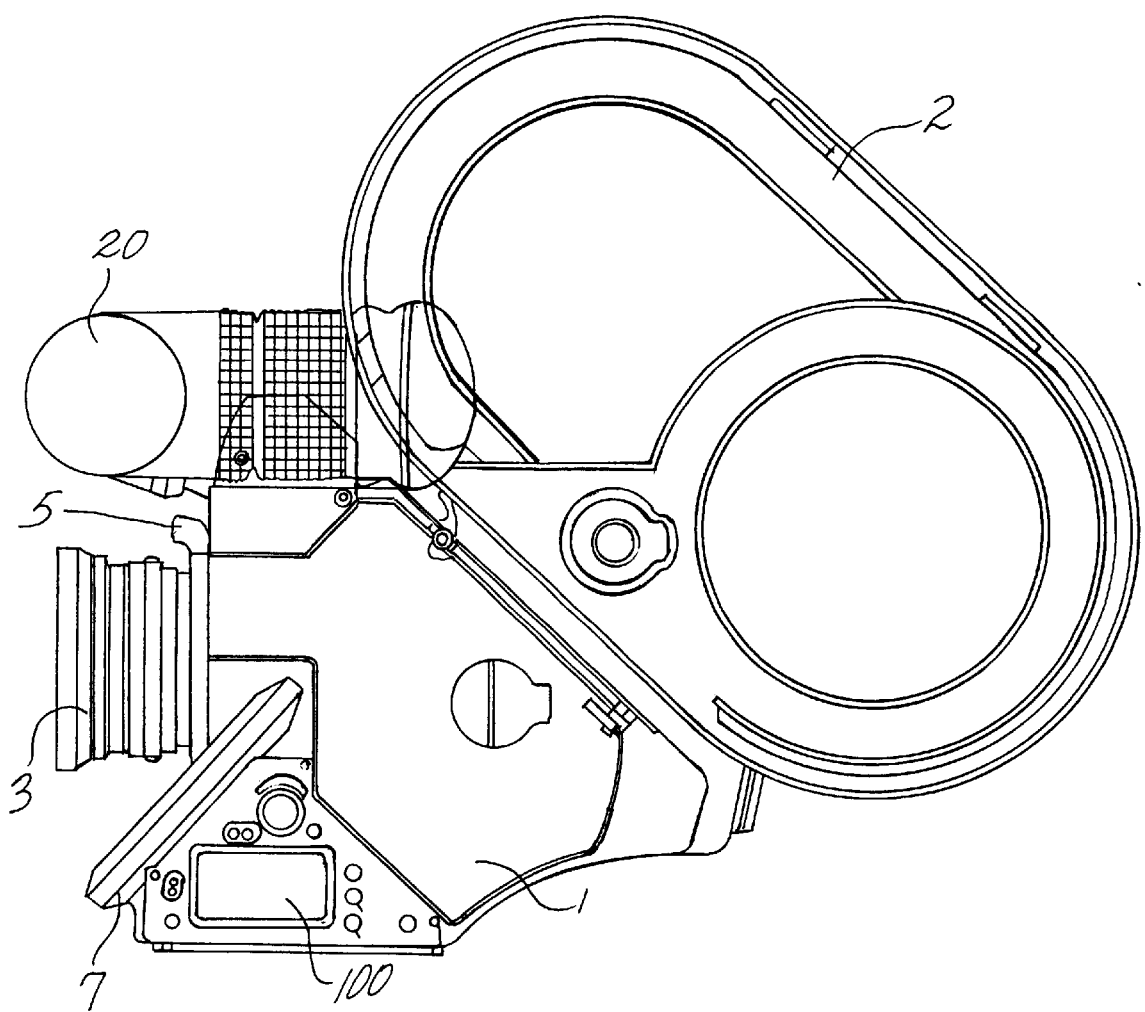
FIG. 1 is a side view of a movie film camera.
Figure 2:
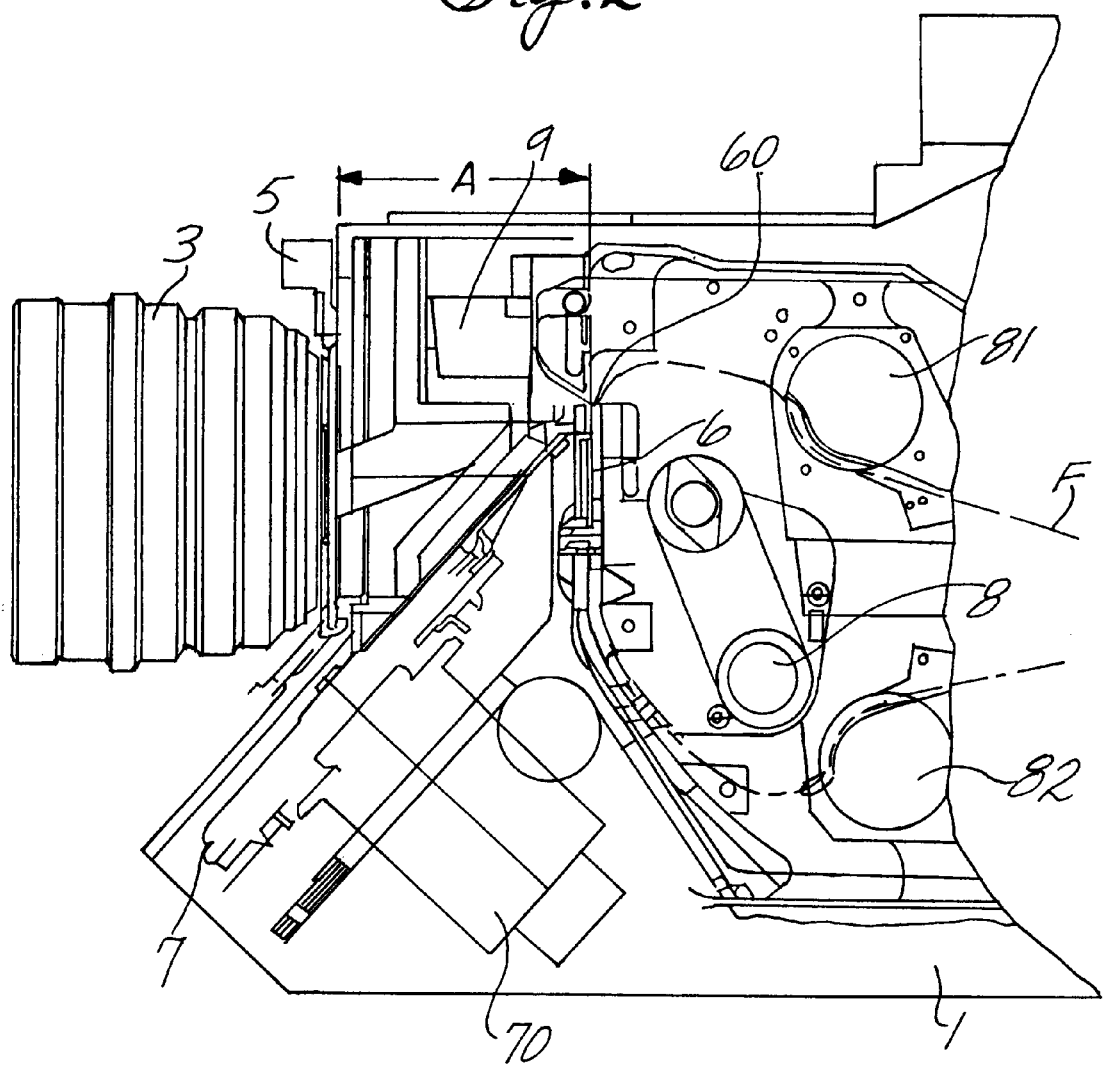
FIG. 2 is a longitudinal sectional view through the front part of the camera housing.

The movie film camera shown in FIG. 1 in side view and in FIG. 2 with a camera housing in partial section has a camera housing 1 with a camera cassette 2 attached thereto containing the film feed spool and film wind-up spool. A touch panel 100 is formed on the camera housing 1 for setting the camera functions and setting and triggering pre-programmable parameters. The camera housing 1 also has a lens carrier 5 for fixing the interchangeable lens 3 on the movie film camera. A film window 6 is arranged in the camera housing 1 in the optical axis of the lens 3 whereby the movie film F is moved intermittently past the window via a negative carrier 60. A reflex shutter 7 driven by a shutter motor 70 releases the beam path entering through the lens 3 to expose a film image of the film F present in the film window 6 and reflects the beam path during the film transport into a viewfinder eyepiece or to other film viewing or processing devices attached to the movie film camera.

The film transport device contains a motor gear assembly 8 for the gripper switch mechanism of the movie film camera and for gear rollers 81, 82 for moving the film F out from and back into the film cassette 2.

Bearing mass A is the distance between the plane of the lens carrier or camera mount 5 and the image plane of the film window 6. Bearing mass A normally represents a constant size because the lens 3 is adjusted so that the focal point of the beam path falling through the lens 3 lies in the image plane, that is, falls into the film window 6. In order to adjust the picture definition in dependence on the distance of the object to be taken from the camera, a lens ring attached to the lens 3 is turned which leads via the gear mechanism to displacement of the lens system so that as a result of this the focal point plane is moved into the image plane, that is, into the plane of the film window 6.

Instead of a displacement of the lens system in the camera lens 3, according to the invention, to adjust the image definition the distance between a lens socket part, the end of the lens facing the movie film camera, and the film window 6 in which the movie film F is moved past intermittently, is changed by means of an adjustment device 9. The setting and position of the lens 3 thereby remains unchanged insofar as this relates to the setting of the image definition, that is, a lens with a fixed focal width can be used, for example. Additional setting possibilities on the lens, for adjusting the focal width or iris diaphragm, remain unaffected by this.

A change in the distance between the lens fastener on the camera side and the film window 6, in most cases, means a change in the bearing mass A between the lens carrier 5 and the film window 6. However, using a lens adapter can also mean a change in the distance between the lens socket part of the lens adapter and the film window 6.

Different embodiments for changing the distance between the lens plane and the image plane by means of a translatory displacement device are illustrated in FIGS. 3 to 6 which will now be described.

Figure 3:
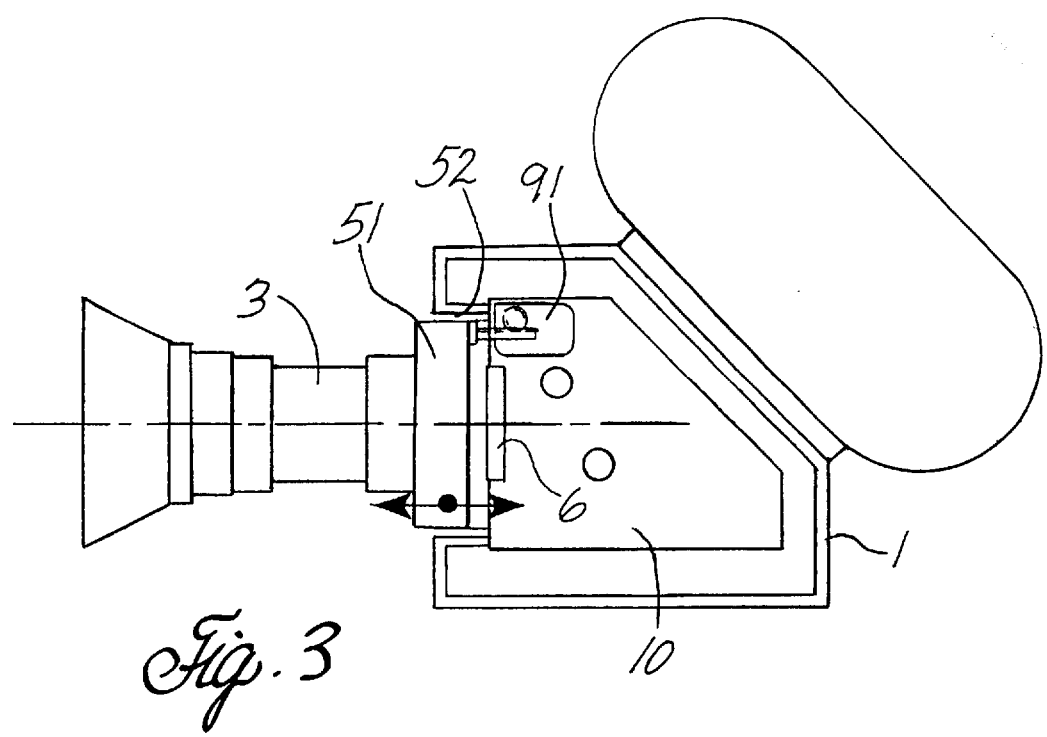
FIG. 3 is a diagrammatic sectional view through a movie film camera with a device for the translatory displacement of the lens carrier.

FIG. 3 shows a diagrammatic section through a movie film camera with a camera housing 1 with a film window 6 which is mounted on a plate 10 connected fixedly to the camera housing 1 or in an inner camera. The camera lens 3 is connected to a lens carrier 51 which is mounted with precision in a lens carrier guide 52 of the camera housing 1. The lens carrier 51 is displaceable in translation inside this lens carrier guide 52 in the direction of the arrows shown by means of an adjustment device 91 so that the lens plane is moved up to the film window 6 or away from the film window 6. By means of this translatory displacement of the lens 3, the beam path passing through the lens 3 is focused onto the image plane of the film window 6 without any image definition adjustment required on the lens 3 itself.

Figure 4:
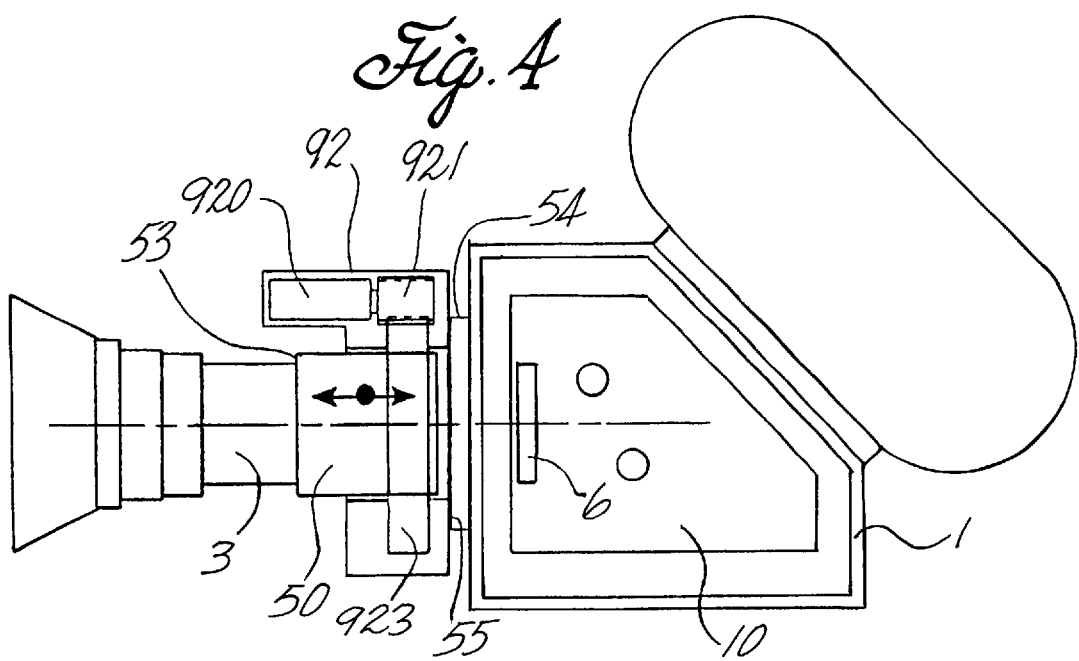
FIG. 4 is a diagrammatic sectional view through a movie film camera with a translatory displaceable adapter between the lens and lens carrier.

FIG. 4 shows a variation of the translatory image definition adjustment with a diagrammatic sectional view through a movie film camera with a camera housing 1 in which an inner camera or camera plate 10 is mounted with a film window 6 fixed in or on the camera plate. Instead of a lens carrier in this embodiment, a flange 54 is provided on the camera housing 1 for holding a lens adapter 50 which has a lens socket part (or fastener) 53 on which the camera lens 3 is fixed, for example, by means of a bayonet lock and also has a camera fixing part (or fastener) 55 which can be connected to the flange 54. The lens adapter 50 contains an adjustment device 92 with adjustment motor 920 such as, for example, an ultrasound motor, a pinion 921 connected to the adjustment motor 920, and a worm wheel 923 meshing with the pinion 921 and having an inner worm for adjusting the length of the lens adapter 50 in the direction of the arrows shown in FIG. 4.

Instead of the adjustment device 92 shown diagrammatically in FIG. 4, any other suitable adjustment device can be provided for the translatory displacement of the camera lens 3 provided this meets the requirements regarding adequate precision and speed of displacement.

Figure 5:
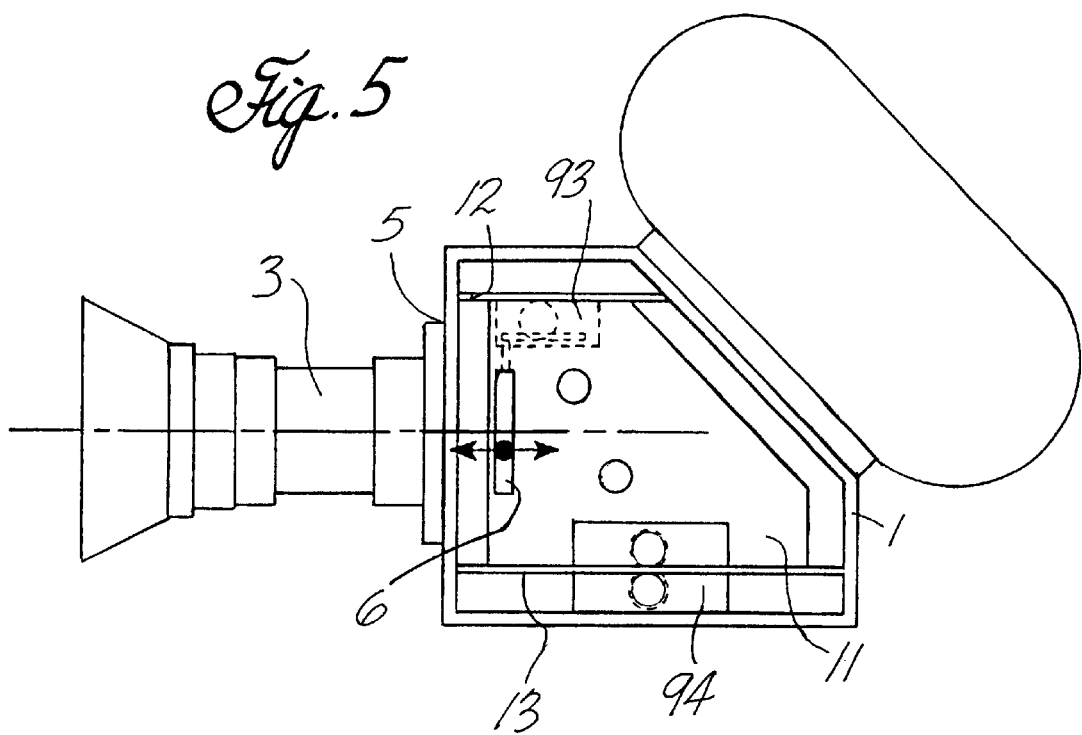
FIG. 5 is a diagrammatic sectional view through a movie film camera with a device for the translatory displacement of the film window or an inner camera.

A further variation for changing the distance between the lens plane and the image plane is shown diagrammatically in FIG. 5 which shows a camera housing 1 with an inner camera 11 mounted therein, in which a film window 6 is fixed. The lens 3 is fixedly connected through the lens carrier or camera mount 5 to the camera housing 1 while the film window 6 is adjustable by means of a device 93 with translation movement in the direction of the arrows shown, whereby the bearing mass for setting the image definition is changed.

As an alternative for a suitable translatory displacement of the film window 6, it is possible for the inner camera 11 to move relative to the camera housing 1, while the film window 6 is fixedly connected to the inner camera 11. In this embodiment the inner camera 11 is guided in a guide device having a guide slide/guide rail combination 12,13 and is moved relative to the camera housing 1 in translation in the direction of the arrow shown in FIG. 5 by means of an adjustment device 94. Obviously the guide of the inner camera 11 by means of the guide slide/guide rail combination 12, 13 must be so precise that both an exact film state and an exact guide of the film window 6 are guaranteed.

A translatory displacement of the film window 6 or inner camera 11 for adjusting the film definition can be combined in a particularly advantageous way with noise-absorbing measures for preventing the transfer of body sounds from the inner camera 11 with the noise-producing film transport mechanism mounted therein to the camera housing 1. A combination of this kind of noise-deadening connecting elements between the inner camera 11 and camera housing 1 with a translatory displacement device for setting the image definition is shown in FIG. 6.

Figure 6:
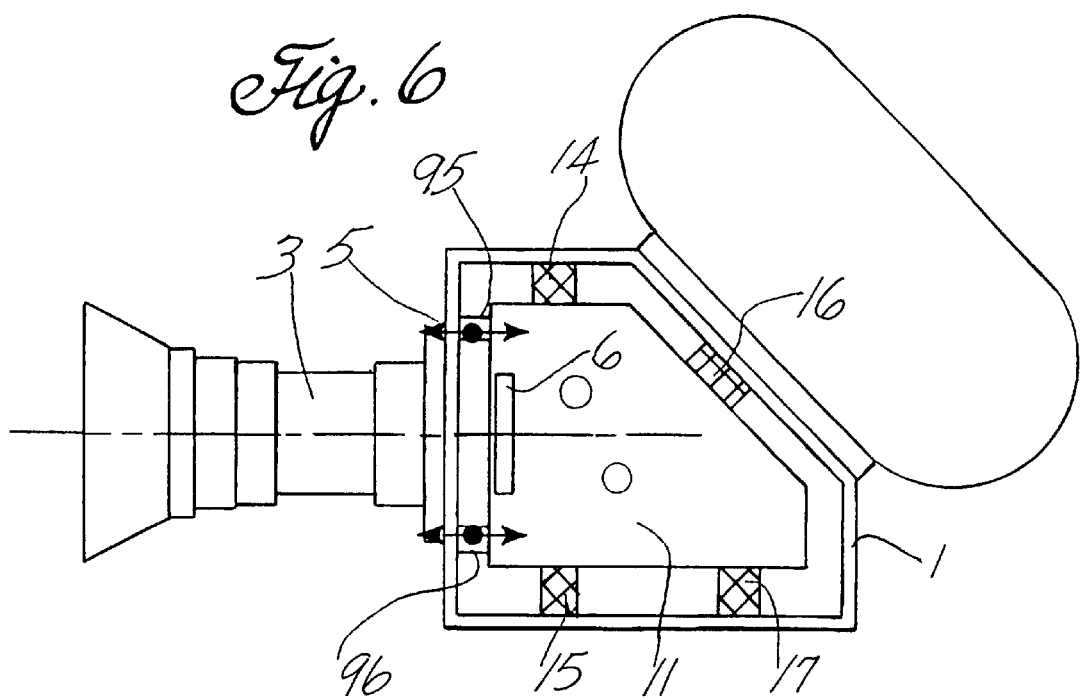
FIG. 6 is a diagrammatic sectional view through a movie film camera with displacement elements mounted between the camera housing and inner camera for the translatory displacement of the film plane and for sound absorption.

FIG. 6 shows a diagrammatic view through a movie film camera with a camera housing 1, a lens 3 on the camera housing 1 connected to the camera housing 1 through a lens carrier 5, and an inner camera mounted in the camera housing 1 or a camera skeleton of the inner camera 11 in which the film transport mechanism and film window 6 are mounted. The inner camera is supported relative to the camera housing 1 through passive noise-insulating connecting elements 14, 15 16, 17. To change the bearing mass between the lens plane and the image plane, as well as for additional noise and vibration insulation between the inner camera and camera housing with a constant bearing dependent on the image definition setting between the lens plane and image plane, active connecting elements 95, 96 are provided between the camera housing 1 and the inner camera 11 parallel to the optical axis of the movie film camera.

The active connecting elements 95, 96 cause firstly a change in the distance between the lens plane and image plane in dependence on the focusing of the beam path passing through the lens 3 onto the image plane in the film window 6, and secondly, a reduction or isolation of the noise through a change in its active inherent stiffness. To this end, the connecting elements 95, 96 are formed so that they act like a very soft spring in relation to the higher-frequency force which periodically occurs with the operating or image frequency or a multiple of this frequency and which is to be conveyed back to the transport mechanism in the inner camera 11, while they act like a very stiff spring in relation to the lower-frequency inertia and gravity forces, for example, in the case of a camera pan or incline of the movie film camera.

The connecting elements 95, 96 therefore have a sufficiently high inherent stiffness so that the inertia and gravity forces cause only negligibly small relative movements between the inner camera 11 and camera housing 1. The construction and function of the connecting elements 95, 96 are shown diagrammatically in FIG. 7.

FIG. 7 shows a diagrammatic section of the front side of the camera housing 1 in the area of the lens carrier 5 connected to the camera housing 1. Between the front side of the camera housing 1 and the inner camera 11 with the film window 6 fixed therein, there is mounted the connecting element 95 whose length can be changed to alter the distance between the lens plane and image plane, that is the distance between the camera housing 1 and the inner camera 11. The control of the displacement element 95 is through a focusing device 4 whose construction and function will be described by way of example with reference to the arrangement shown in FIG. 8.

A dynamically controllable noise-insulating connecting element 950 is connected to the displacement element 95. This connecting element 950 consists of an electromagnetic, electrostrictive, magnetostrictive, piezoelectric converter element or another converter element which can be changed in its dimensions in another way through the action of a control signal, and which can be switched selectively in parallel with a spring element with predetermined stiffness or spring constant. The spring constant of the parallel switched spring element is thereby so great that the inertia force and the gravity force cause only very small changes in length, which does not lead to any impairment in the bearing mass or the photographic performance of the movie film camera.

Alternatively, the dynamically controllable, noise-insulating connecting element 950 can consist of an electromagnetically, electrostrictive, magnetostrictive or piezoelectric converter with sufficiently high inherent stiffness or with spring constant C. Through dynamically controlling the converter element, its length and thus the overall length of the dynamically controllable noise-insulating connecting element 950 is changed without the need for any additional spring element connected in parallel with the converter element.

In order to determine the distance between the lens plane and the film plane, a length measuring sensor 21 is provided whose length-proportional sensor output signal is sent through a filter element 22 to a control and regulator device 25. The length-proportional sensor output signal of the length measuring sensor 21 is composed of a focusing component and a time-dependent sensor signal for determining the forces which act between the camera housing 1 and the inner camera 11. The control signals issued by the control and regulator device 25, preferably a micro processor, are on the one hand, supplied directly as an electrical control signal to the dynamically controllable noise-insulating connecting element 950 and on the other, supplied to the focusing device 4 which changes, for example, by means of a motor-driven displacement device, the length of the displacement element 95 used for adjusting the image definition.

FIG. 8 shows a block circuit diagram of a focusing device 4 which can be used in each of the previously described embodiments for adjusting the focus. The focusing device 4 contains a direct current voltage converter 41 which is connected to a direct current voltage source 23 and supplies the partial voltages required for operation. In order to obtain an even driving effect when focusing, the focusing device can be fitted with an electronic stabilizing and regulating system whereby through an electronic counter voltage brake the mechanical inertia moment is switched off so that when releasing, for example, a thumb turn handle or a button for setting the image definition, the displacement device controlled by the focusing device stops immediately without running on.

The stabilizing and regulating system consists of a speed transmitter (or generator) 42 and a sensitivity setting 43 whose output signal is supplied to a control amplifier 44. The control amplifier controls a driver stage 45 whose output signal is sent through an end stage 46 to an adjustment motor 48. The adjustment motor 48 is coupled mechanically to a tachogenerator 47 whose output voltage signal is coupled back to the control amplifier 44. The direct current voltage converter 41 supplies both the speed generator 42 and also the driver stage 45 and the end stage 46.

The control amplifier 44 is additionally connected to the output of a setting member 40, for example, an adjustment button for focusing. Alternatively, instead of the setting member 40, the control and regulator device 25 according to FIG. 7 can be used whereby the control and regulator device 25 is provided with a corresponding input field such as the touch panel 100 shown in FIG. 1 for setting different camera functions or triggering preset or pre-programmed camera functions.

The embodiments described above can be modified and expanded in many ways. Thus, for example, instead of the motor-driven displacement devices, preferably by using an ultrasound motor, an electromagnetic, electrostrictive, magnetostrictive or piezoelectric displacement device can be provided, which under the action of a control signal carries out a sufficient length change to cause, in the desired adjustment area, a focusing of the beam path passing through the lens.

The device described above can also be used for adjusting the image definition for an adequate focal width setting in a single or multi-part lens.

The invention is particularly suitable for use in devices for automatically focusing (autofocus) where the control device for the displacement devices and elements or the super-mounted control and regulator device is connected to an autofocus device. Advantageously, an automatic focusing of this kind is linked with a manual focusing which can be used alternatively or is used after pre-setting by the device for automatic focusing for fine adjustment.

What is claimed is:

1. A device for focusing a film image in a movie film camera comprising:

a camera housing having a lens carrier for holding a camera lens mounted in an optical axis of the movie film camera;

an inner camera on which a film transport mechanism is mounted which moves the film along past a film window which is connected to the inner camera; and a noise-insulating connecting device for noise-insulating connection of the inner camera with the camera housing, the connecting device having a displacement device for translatory displacement of the inner camera which changes focus of the film image.

2. The device for focusing according to claim 1 wherein the displacement device is connected to a guide device running parallel to the optical axis of the movie film camera.

3. The device for focusing according to claim 2 wherein the guide device comprises at least one guide rail and a guide slide connected to the displacement device.

4. The device for focusing according to claim 2 wherein the displacement device comprises one of an electromagnet, electrostrictive, magnetostrictive and piezoelectric converter whose length can be changed by means of a control switch.

5. The device for focusing according to claim 1 wherein the displacement device moves one of the lens carrier and the camera lens in translation along the optical axis of the movie film camera.

6. The device for focusing according to claim 5 further comprising a lens adapter between the camera lens and the lens carrier and having an adjustment device for the translatory displacement of the distance between a lens fastener of the adapter on which the camera lens is fixed and a camera fastener of the adapter which is connected to the lens.

7. The device for focusing according to claim 1 wherein the displacement device is connected to a focusing device for automatically focusing a film picture.

* * * * *